United States Patent
Morgan et al.

(10) Patent No.: US 10,634,154 B2
(45) Date of Patent: Apr. 28, 2020

(54) CENTRIFUGAL COMPRESSOR AND MAGNETIC BEARING BACKUP SYSTEM FOR CENTRIFUGAL COMPRESSOR

(71) Applicant: Daikin Applied Americas Inc., Minneapolis, MN (US)

(72) Inventors: Jeffrey Allen Morgan, Fishersville, VA (US); Fumiaki Onodera, Minnetonka, MN (US); Tsuyoshi Ueda, Plymouth, MN (US)

(73) Assignee: DAIKIN APPLIED AMERICAS INC., Minneapolis, MN (US)

( * ) Notice: Subject to any disclaimer, the term of this patent is extended or adjusted under 35 U.S.C. 154(b) by 477 days.

(21) Appl. No.: 15/218,432

(22) Filed: Jul. 25, 2016

(65) Prior Publication Data

US 2018/0023584 A1 Jan. 25, 2018

(51) Int. Cl.
*F04D 29/057* (2006.01)
*F16C 32/04* (2006.01)
(Continued)

(52) U.S. Cl.
CPC ........... *F04D 29/057* (2013.01); *F04D 17/10* (2013.01); *F04D 17/12* (2013.01); *F04D 17/122* (2013.01);
(Continued)

(58) Field of Classification Search
CPC ............... F25B 31/026; F16C 32/0402; F16C 32/0442; F16C 2360/44; F04D 27/008;
(Continued)

(56) References Cited

U.S. PATENT DOCUMENTS

| | | | | |
|---|---|---|---|---|
| 4,141,604 A | * | 2/1979 | Habermann | F01D 25/16 310/90.5 |
| 5,345,127 A | * | 9/1994 | New | F16C 32/0402 310/90.5 |

(Continued)

FOREIGN PATENT DOCUMENTS

| | | |
|---|---|---|
| CN | 103343775 A | 10/2013 |
| EP | 0 580 202 A1 | 1/1994 |

(Continued)

OTHER PUBLICATIONS

The International Search Report for the corresponding international application No. PCT/US2017/042349, dated Oct. 20, 2017.

(Continued)

*Primary Examiner* — Kenneth J Hansen
*Assistant Examiner* — Justin A Pruitt
(74) *Attorney, Agent, or Firm* — Global IP Counselors, LLP (57) ABSTRACT

A centrifugal compressor includes a casing, an impeller, a motor, a diffuser, a magnetic bearing, and a magnetic bearing backup system including at least one dynamic gas bearing and at least one hydrostatic gas bearing. The impeller is attached to a shaft rotatable about a rotation axis. The motor is configured and arranged to rotate the shaft in order to rotate the impeller. The magnetic bearing rotatably supports the shaft. The magnetic bearing backup system is configured and arranged to support the shaft when the magnetic bearing stops operating. The at least one dynamic gas bearing and the at least one hydrostatic gas bearing of the magnetic bearing backup system are disposed radially inwardly relative to the magnetic bearing.

19 Claims, 7 Drawing Sheets

(51) Int. Cl.
*F16C 17/02* (2006.01)
*F16C 32/06* (2006.01)
*F04D 17/10* (2006.01)
*F04D 29/058* (2006.01)
*F04D 29/28* (2006.01)
*F25B 31/02* (2006.01)
*F04D 27/02* (2006.01)
*F04D 17/12* (2006.01)
*F04D 27/00* (2006.01)

(52) U.S. Cl.
CPC ....... *F04D 27/0292* (2013.01); *F04D 29/058* (2013.01); *F04D 29/284* (2013.01); *F16C 17/026* (2013.01); *F16C 32/0402* (2013.01); *F16C 32/0442* (2013.01); *F16C 32/0446* (2013.01); *F16C 32/0614* (2013.01); *F25B 31/026* (2013.01); *F04D 27/008* (2013.01); *F05B 2210/14* (2013.01); *F05B 2240/515* (2013.01); *F05B 2240/53* (2013.01); *F16C 2210/00* (2013.01); *F16C 2360/44* (2013.01)

(58) Field of Classification Search
CPC ...... F04D 27/0292; F04D 17/10; F04D 17/12; F04D 17/122; F04D 29/046; F04D 29/047; F04D 29/0473; F04D 29/0476; F04D 29/048; F04D 29/057; F04D 29/058; F04D 29/284; F05B 2210/14; F05B 2240/515; F05B 2240/53
USPC ........................................ 416/174
See application file for complete search history.

(56) References Cited

U.S. PATENT DOCUMENTS

| | | | |
|---|---|---|---|
| 5,857,348 A | 1/1999 | Conry | |
| 5,897,299 A * | 4/1999 | Fukunaga | F04D 29/057 417/310 |
| 8,739,538 B2 * | 6/2014 | Myers | F01D 1/023 290/4 C |
| 2010/0006262 A1 * | 1/2010 | Welch | F25B 31/006 165/104.11 |
| 2012/0107143 A1 * | 5/2012 | Gilarranz | F04D 25/0606 417/53 |
| 2013/0098101 A1 * | 4/2013 | Ishida | C09K 5/045 62/468 |
| 2014/0341710 A1 * | 11/2014 | Creamer | F16C 33/1005 415/111 |

FOREIGN PATENT DOCUMENTS

JP        2000-2469 A    1/2000
KR    10-2013-0122885 A    11/2013

OTHER PUBLICATIONS

International Preliminary Report on Patentability including Written Opinion for the corresponding international application No. PCT/US2017/042349, dated Jan. 29, 2019.

* cited by examiner

CENTRIFUGAL COMPRESSOR AND MAGNETIC BEARING BACKUP SYSTEM FOR CENTRIFUGAL COMPRESSOR

BACKGROUND

Field of the Invention

The present invention generally relates to a centrifugal compressor used in a chiller system. More specifically, the present invention relates to a centrifugal compressor with a magnetic bearing backup system.

Background Information

A chiller system is a refrigerating machine or apparatus that removes heat from a medium. Commonly a liquid such as water is used as the medium and the chiller system operates in a vapor-compression refrigeration cycle. This liquid can then be circulated through a heat exchanger to cool air or equipment as required. As a necessary byproduct, refrigeration creates waste heat that must be exhausted to ambient or, for greater efficiency, recovered for heating purposes. A conventional chiller system often utilizes a centrifugal compressor, which is often referred to as a turbo compressor. Thus, such chiller systems can be referred to as turbo chillers. Alternatively, other types of compressors, e.g. a screw compressor, can be utilized.

In a conventional (turbo) chiller, refrigerant is compressed in the centrifugal compressor and sent to a heat exchanger in which heat exchange occurs between the refrigerant and a heat exchange medium (liquid). This heat exchanger is referred to as a condenser because the refrigerant condenses in this heat exchanger. As a result, heat is transferred to the medium (liquid) so that the medium is heated. Refrigerant exiting the condenser is expanded by an expansion valve and sent to another heat exchanger in which heat exchange occurs between the refrigerant and a heat exchange medium (liquid). This heat exchanger is referred to as an evaporator because refrigerant is heated (evaporated) in this heat exchanger. As a result, heat is transferred from the medium (liquid) to the refrigerant, and the liquid is chilled. The refrigerant from the evaporator is then returned to the centrifugal compressor and the cycle is repeated. The liquid utilized is often water.

A conventional centrifugal compressor basically includes a casing, an inlet guide vane, an impeller, a diffuser, a motor, various sensors and a controller. Refrigerant flows in order through the inlet guide vane, the impeller and the diffuser. Thus, the inlet guide vane is coupled to a gas intake port of the centrifugal compressor while the diffuser is coupled to a gas outlet port of the impeller. The inlet guide vane controls the flow rate of refrigerant gas into the impeller. The impeller increases the velocity of refrigerant gas. The diffuser works to transform the velocity of refrigerant gas (dynamic pressure), given by the impeller, into (static) pressure. The motor rotates the impeller. The controller controls the motor, the inlet guide vane and the expansion valve. In this manner, the refrigerant is compressed in a conventional centrifugal compressor. A conventional centrifugal compressor may have one or two stages. A motor rotates one or more impellers via a shaft. A bearing system supports the shaft of the motor.

The bearing system in the conventional centrifugal compressor may include a gas bearing. The gas bearing uses refrigerant gas to support the shaft of the motor. See for example U.S. Pat. No. 5,857,348.

SUMMARY

In a centrifugal compressor, magnetic bearings may also be used as a bearing system. Magnetic bearings support a rotating shaft of a motor using magnetic force. While magnetic bearings have advantage in that they support a rotating shaft without physical contact and thus they do not need lubricant oil, magnetic bearings require a backup bearing system in the case of power or control system failure.

As the backup bearing system for the magnetic bearings, rolling-element bearings including ball bearings or ceramic bearings can be used. However, it has been discovered that ball bearings need lubricant oil and such oil-lubricated bearings may not be sufficient in terms of reliability. It has also been discovered that ceramic bearings are relatively high in cost although they do not need lubricant oil.

Therefore an object of the present invention is to provide a centrifugal compressor with a magnetic bearing backup system which does not need lubricant oil, and achieves relatively low cost and relatively high reliability.

One or more of the foregoing objects can basically be achieved by providing a centrifugal compressor adapted to be used in a chiller system, the centrifugal compressor including a casing, an impeller, a motor, a diffuser, a magnetic bearing, and a magnetic bearing backup system including at least one dynamic gas bearing and at least one hydrostatic gas bearing. The casing has an inlet portion and an outlet portion. The impeller is attached to a shaft rotatable about a rotation axis. The motor is configured and arranged to rotate the shaft in order to rotate the impeller. The diffuser is disposed in the outlet portion downstream of the impeller. The magnetic bearing rotatably supports the shaft. The magnetic bearing backup system is configured and arranged to support the shaft when the magnetic bearing stops operating. The at least one dynamic gas bearing and the at least one hydrostatic gas bearing of the magnetic bearing backup system are disposed radially inwardly relative to the magnetic bearing.

One or more of the foregoing objects can also be achieved by providing a magnetic bearing backup system for a centrifugal compressor adapted to be used in a chiller system, the magnetic bearing backup system including at least one gas bearing selected from a dynamic gas bearing and a hydrostatic gas bearing. The at least one gas bearing is configured and arranged to support a shaft of the centrifugal compressor when the magnetic bearing stops operating. The at least one gas bearing is disposed radially inwardly relative to a magnetic bearing of the centrifugal compressor.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENT(S)

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
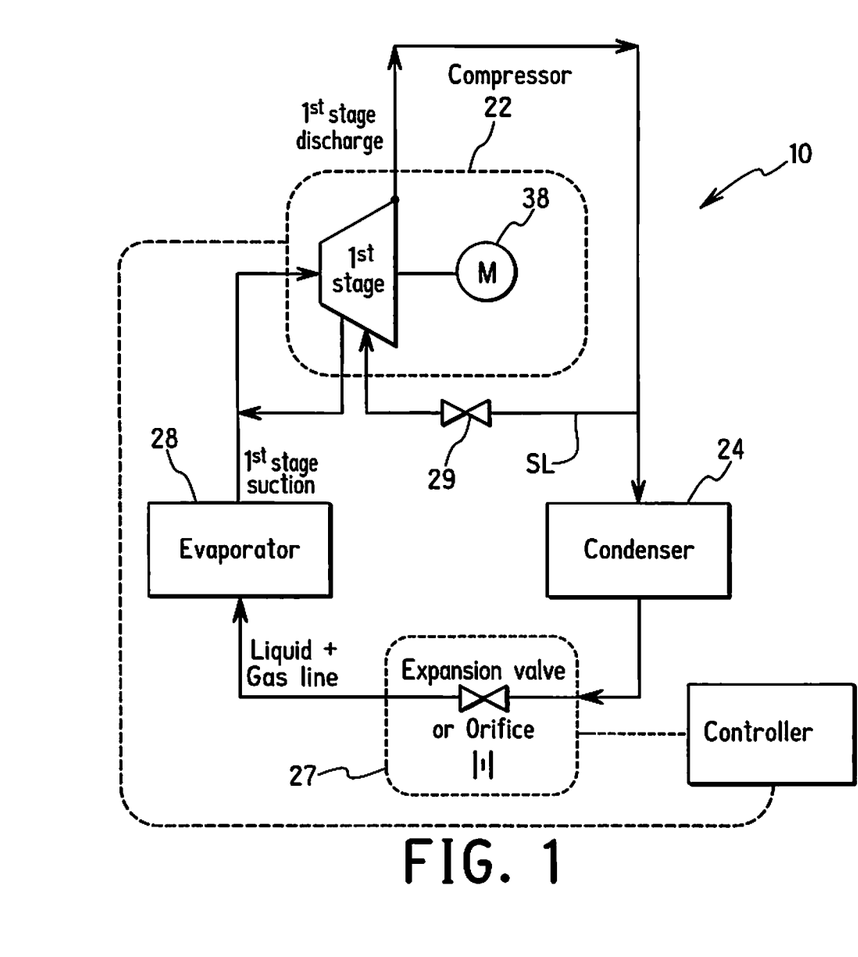
FIG. 1 is a schematic diagram illustrating a single stage chiller system having a centrifugal compressor in accordance with an embodiment of the present invention.
Figure 2:
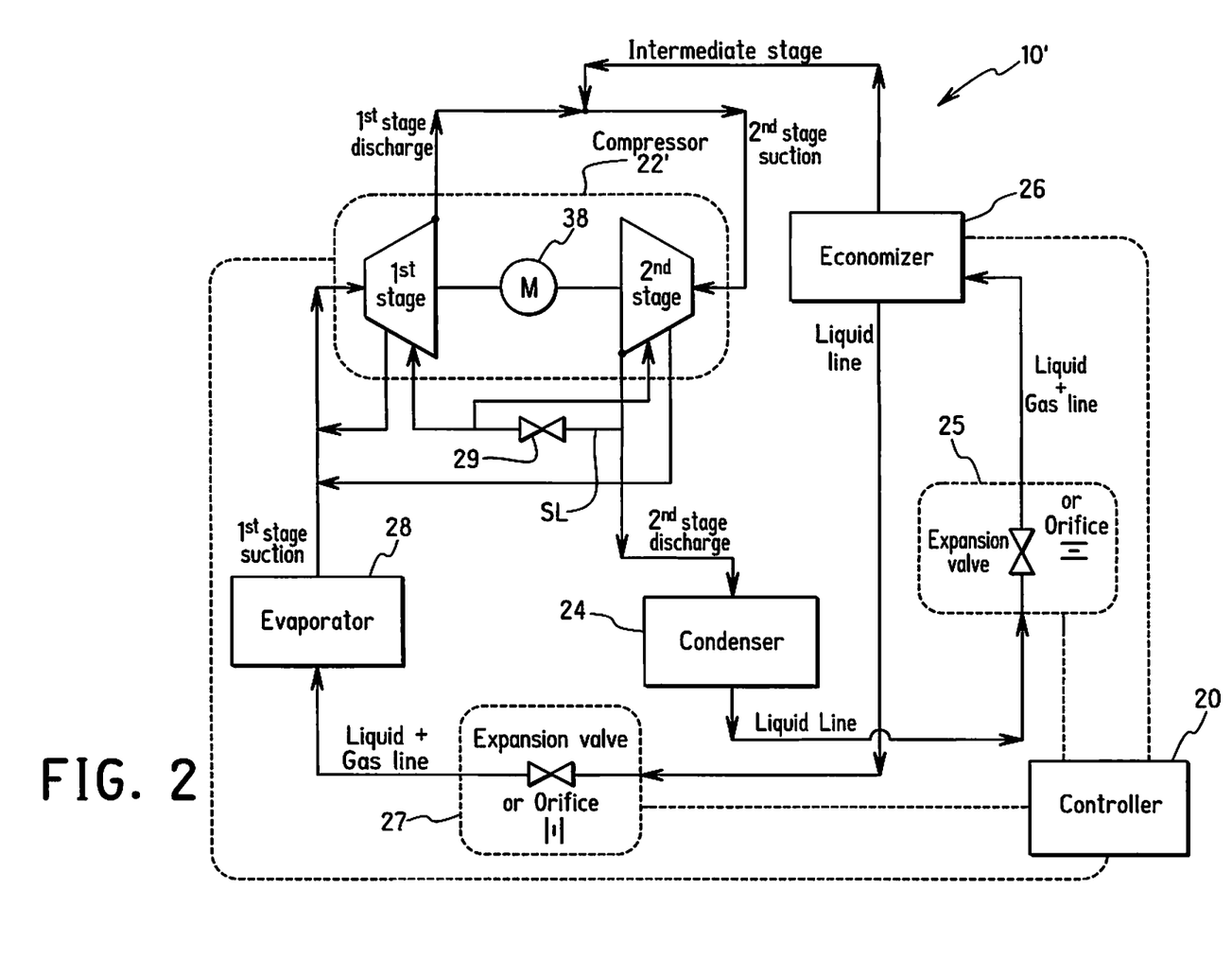
FIG. 2 is a schematic diagram illustrating a two stage chiller system (with an economizer) having a centrifugal compressor in accordance with an embodiment of the present invention.

Referring initially to FIGS. 1 and 2, chiller systems 10 and 10' having centrifugal compressors 22 and 22' in accordance with an embodiment of the present invention are illustrated. The centrifugal compressor 22 of FIG. 1 is a single stage compressor, and thus, the chiller system 10 of FIG. 1 is a single stage chiller system. The centrifugal compressor 22' of FIG. 2 is a two stage compressor, and thus, the chiller system 10' of FIG. 2 is a two stage chiller system. The two stage chiller system of FIG. 2 also includes an optional economizer. FIGS. 1 and 2 merely illustrate two examples of chiller systems in which centrifugal compressors 22 and 22' in accordance with the present invention can be used.

The chiller systems 10 and 10' are conventional, except for the centrifugal compressors 22 and 22' which include a magnetic bearing backup system in accordance with the present invention. Therefore the chiller systems 10 and 10' will not be discussed and/or illustrated in detail herein except as related to the centrifugal compressors 22 and 22' which includes a magnetic bearing backup system in accordance with the present invention. However, it will be apparent to those skilled in the art that the conventional parts of the chiller systems 10 and 10' can be constructed in variety of ways without departing the scope of the present invention. In the illustrated embodiments, the chiller systems 10 and 10' are preferably water chillers that utilize cooling water and chiller water in a conventional manner.

The centrifugal compressors 22 and 22' are identical to each other, except the centrifugal compressor 22' is a two stage compressor. Thus, it will be apparent to those skilled in the art from this disclosure that the single stage compressor 22 is identical to the centrifugal compressor 22', except for the removal of parts. Therefore, the two stage compressor 22' includes all the parts of the single stage compressor 22, but also includes additional parts. Accordingly, it will be apparent to those skilled in the art from this disclosure that the descriptions and illustrations of the two stage compressor 22' also apply to the single stage compressor 22, except for parts relating to the second stage of compression and modifications related to the second stage of compression (e.g., the housing shape, shaft end shape, etc.). In view of these points, and for the sake of brevity, only the two stage compressor 22' will be explained and/or illustrated in detail herein. The compressor 22' will be explained in more detail below.

Referring again to FIGS. 1-2, the components of the chiller systems 10 and 10' will now briefly be explained. The chiller system 10 basically includes a chiller controller 20, the compressor 22, a condenser 24, an expansion valve or orifice (expansion mechanism) 27, and an evaporator 28 connected together in series to form a loop refrigeration cycle. The chiller system 10' includes a chiller controller 20, the centrifugal compressor 22', a condenser 24, an expansion valve or orifice (expansion mechanism) 25, an economizer 26, an expansion valve or orifice (expansion mechanism) 27, and an evaporator 28 connected together in series to form a loop refrigeration cycle. However, the economizer 26 can be removed. In either case, various sensors (not shown) are disposed throughout the circuits of the chiller systems 10 and 10' to control the chiller systems 10 and 10' in a conventional manner. A capillary tube can be used for the expansion mechanisms 25 and 27.

The chiller systems 10 and 10' further includes an expansion valve (expansion mechanism) 29 to supply refrigerant gas to a magnetic bearing backup system 50 in accordance with the present invention. The expansion valve 29 is disposed in a refrigerant supply line, which connects an area between the compressor 22 or 22' and the condenser 24, to supply refrigerant gas to the magnetic bearing backup system 50, as explained in more detail below.

Figure 3:
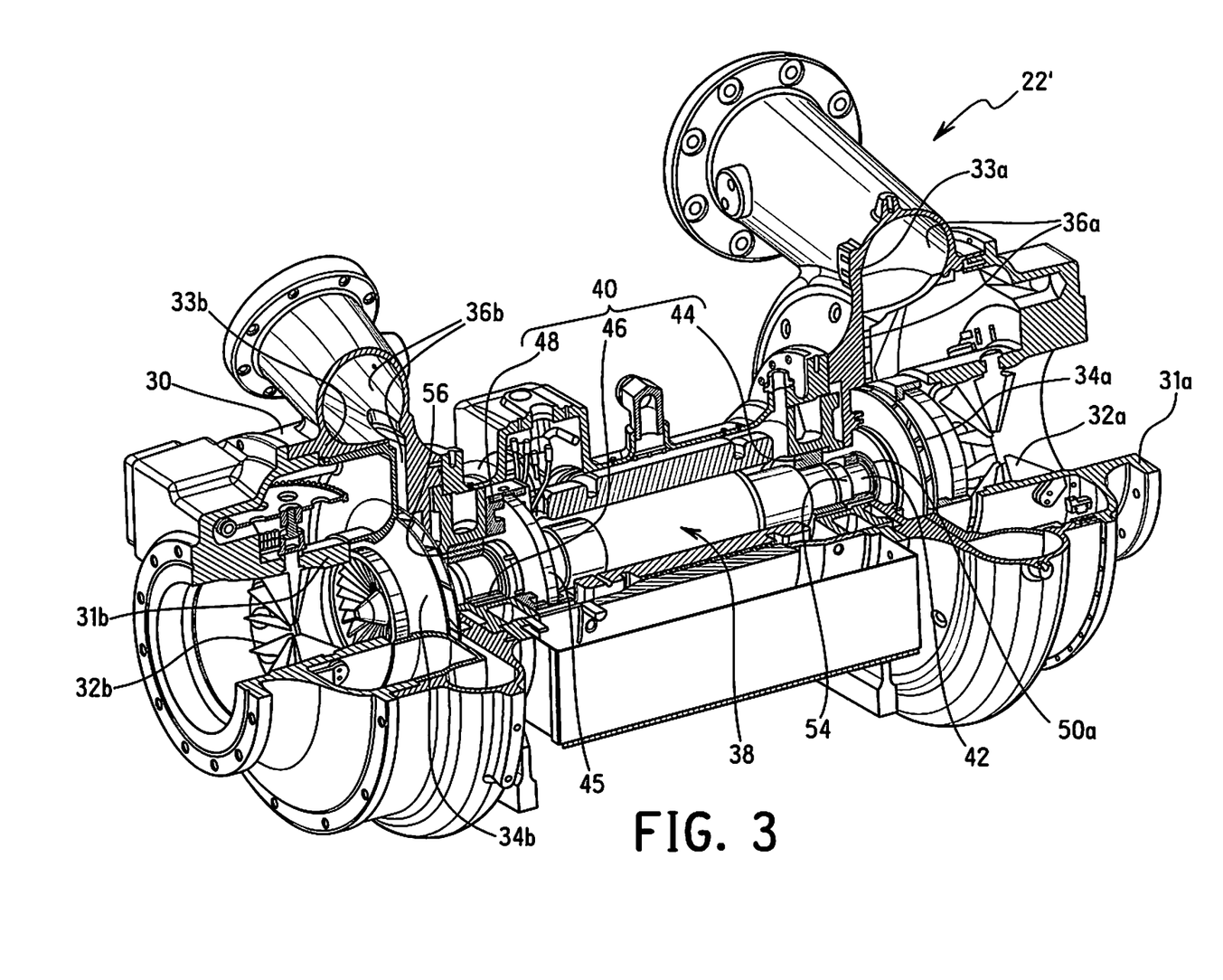
FIG. 3 is a perspective view of the centrifugal compressor of the chiller system illustrated in FIG. 2, with portions broken away and shown in cross-section for the purpose of illustration.
Figure 4:
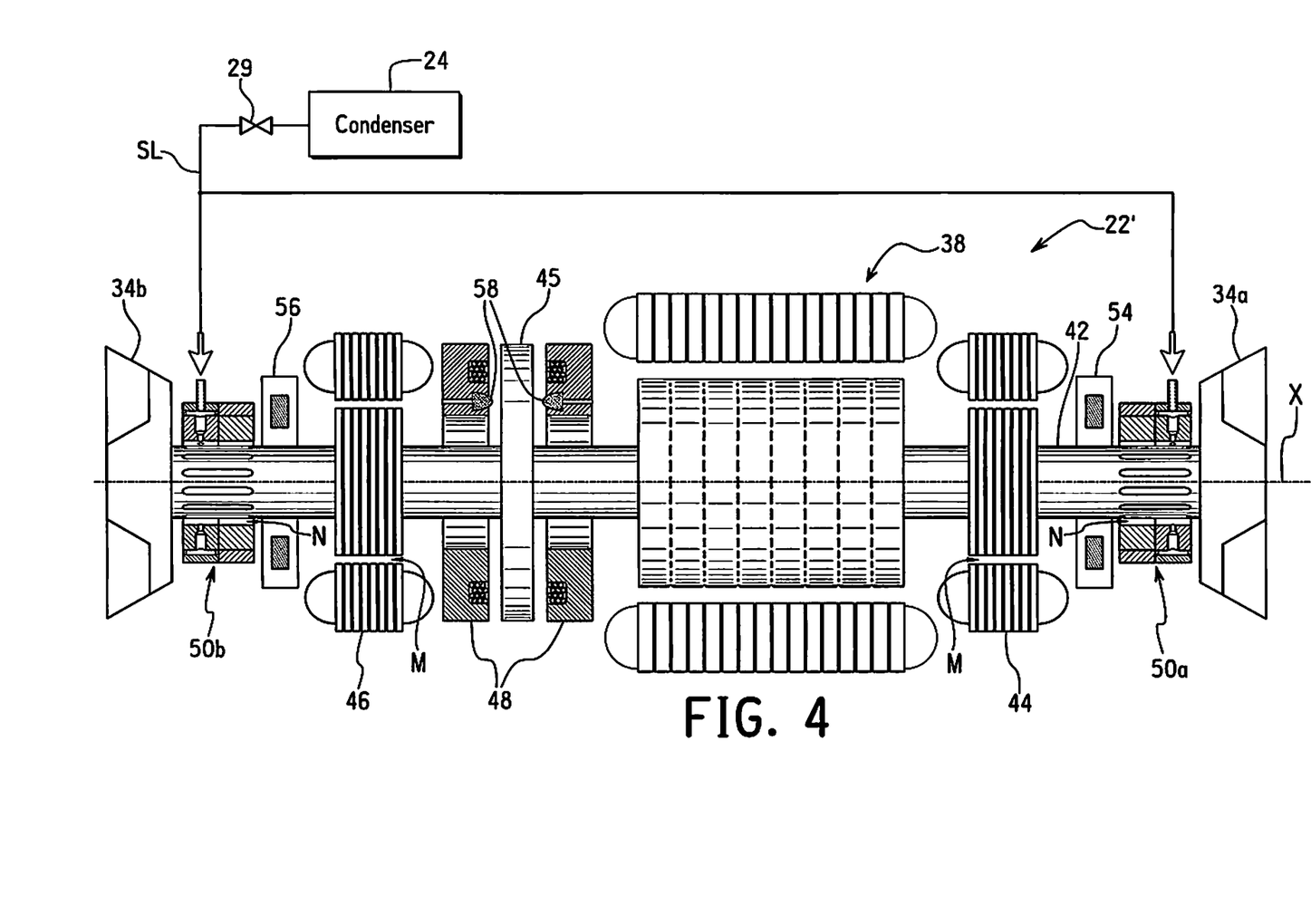
FIG. 4 is a schematic longitudinal cross-sectional view of the impellers, motor and magnetic bearings of the centrifugal compressor illustrated in FIGS. 2 and 3 with a magnetic bearing backup system in accordance with an embodiment of the present invention.

Referring now to FIGS. 1-4, mainly FIGS. 3 and 4, the compressor 22' will now be explained in more detail. The compressor 22' is a two-stage centrifugal compressor in the illustrated embodiment. Thus, the compressor 22' illustrated herein includes two impellers. However, the compressor 22' include three or more impellers (not shown) or may be a single stage compressor as shown in FIG. 1. The two-stage centrifugal compressor 22' of the illustrated embodiment is conventional except that the compressor 22' includes the magnetic bearing backup system 50 as shown in FIGS. 3 and 4, and refrigerant gas is supplied to the magnetic bearing backup system 50 as shown in FIGS. 1, 2 and 4.

The centrifugal compressor 22' includes a first stage impeller 34a and a second stage impeller 34b. The centrifugal compressor 22' further includes a first stage inlet guide vane 32a, a first diffuser/volute 36a, a second stage inlet guide vane 32b, a second diffuser/volute 36b, a compressor motor 38, and a magnetic bearing assembly 40 as well as various conventional sensors (only some shown). A casing 30 covers the centrifugal compressor 22'. The casing 30 includes an inlet portion 31a and an outlet portion 33a for the first stage of the compressor 22'. The casing 30 also includes an inlet portion 31b and an outlet portion 33b for the second stage of the compressor 22'.

The chiller controller 20 receives signals from the various sensors and controls the inlet guide vanes 32a and 32b, the compressor motor 38, and the magnetic bearing assembly 40 in a conventional manner, as explained in more detail below. Refrigerant flows in order through the first stage inlet guide vane 32a, the first stage impeller 34a, the second stage inlet guide vane 32b, and the second stage impeller 34b. The inlet guide vanes 32a and 32b control the flow rate of refrigerant gas into the impellers 34a and 34b, respectively, in a conventional manner. The impellers 34a and 34b increase the velocity of refrigerant gas, generally without changing pressure. The motor speed determines the amount of increase of the velocity of refrigerant gas. The diffusers/volutes 36a and 36b increase the refrigerant pressure. The diffusers/volutes 36a and 36b are non-movably fixed relative to the casing 30. The compressor motor 38 rotates the impellers 34a and 34b via a shaft 42. The magnetic bearing assembly 40 magnetically supports the shaft 42. In this manner, the refrigerant is compressed in the centrifugal compressor 22'.

In operation of the chiller system 10, the first stage impeller 34a and the second stage impeller 34b of the compressor 22' are rotated, and the refrigerant of low pressure in the chiller system 10 is sucked by the first stage impeller 34a. The flow rate of the refrigerant is adjusted by the inlet guide vane 32a. The refrigerant sucked by the first stage impeller 34a is compressed to intermediate pressure, the refrigerant pressure is increased by the first diffuser/volute 36a, and the refrigerant is then introduced to the second stage impeller 34b. The flow rate of the refrigerant is adjusted by the inlet guide vane 32b. The second stage impeller 34b compresses the refrigerant of intermediate pressure to high pressure, and the refrigerant pressure is increased by the second diffuser/volute 36b. The high pressure gas refrigerant is then discharged to the chiller system 10.

Referring to FIGS. 3 and 4, the magnetic bearing assembly 40 is conventional, and thus, will not be discussed and/or illustrated in detail herein, except as related to the present invention. Rather, it will be apparent to those skilled in the art that any suitable magnetic bearing can be used without departing from the present invention. The magnetic bearing assembly 40 preferably includes a first radial magnetic bearing 44, a second radial magnetic bearing 46 and an axial (thrust) magnetic bearing 48. In any case, at least one radial magnetic bearing 44 or 46 rotatably supports the shaft 42. The thrust magnetic bearing 48 supports the shaft 42 along a rotational axis X by acting on a thrust disk 45. The thrust magnetic bearing 48 includes the thrust disk 45 which is attached to the shaft 42.

The thrust disk 45 extends radially from the shaft 42 in a direction perpendicular to the rotational axis X, and is fixed relative to the shaft 42. A position of the shaft 42 along rotational axis X (an axial position) is controlled by an axial position of the thrust disk 45. The first and second radial magnetic bearings 44 and 46 are disposed on opposite axial ends of the compressor motor 38. Various sensors detect radial and axial positions of the shaft 42 relative to the magnetic bearings 44, 46 and 48, and send signals to the chiller controller 20 in a conventional manner. The chiller controller 20 then controls the electrical current sent to the magnetic bearings 44, 46 and 48 in a conventional manner to maintain the shaft 42 in the correct position. The magnetic bearing assembly 40 is preferably a combination of active magnetic bearings 44, 46, and 48, which utilizes gap sensors 54, 56 and 58 to monitor shaft position and send signals indicative of shaft position to the chiller controller 20. Thus, each of the magnetic bearings 44, 46 and 48 are preferably active magnetic bearings.

Referring now to FIGS. 3-6, the magnetic bearing backup system 50 in accordance with the present invention will now be explained in detail. The magnetic bearing backup system 50 is disposed adjacent to both ends of the shaft 42 of the compressor 22' in the axial direction, respectively. In the illustrated embodiment, a first magnetic bearing backup system 50a is disposed adjacent to the end of the shaft 42 on the first stage side of the compressor 22', and a second magnetic bearing backup system 50b is disposed adjacent to the end of the shaft 42 on the second stage side of the compressor 22'. It will be apparent to those skilled in the art from this disclosure that the structures of the magnetic bearing backup system 50a and the magnetic bearing backup system 50b are identical, except that they are mirror images of each other. Therefore, the magnetic bearing backup system 50a and the magnetic bearing backup system 50b are also collectively referred to as the magnetic bearing backup system 50 hereinafter.

Figures 5, 6:
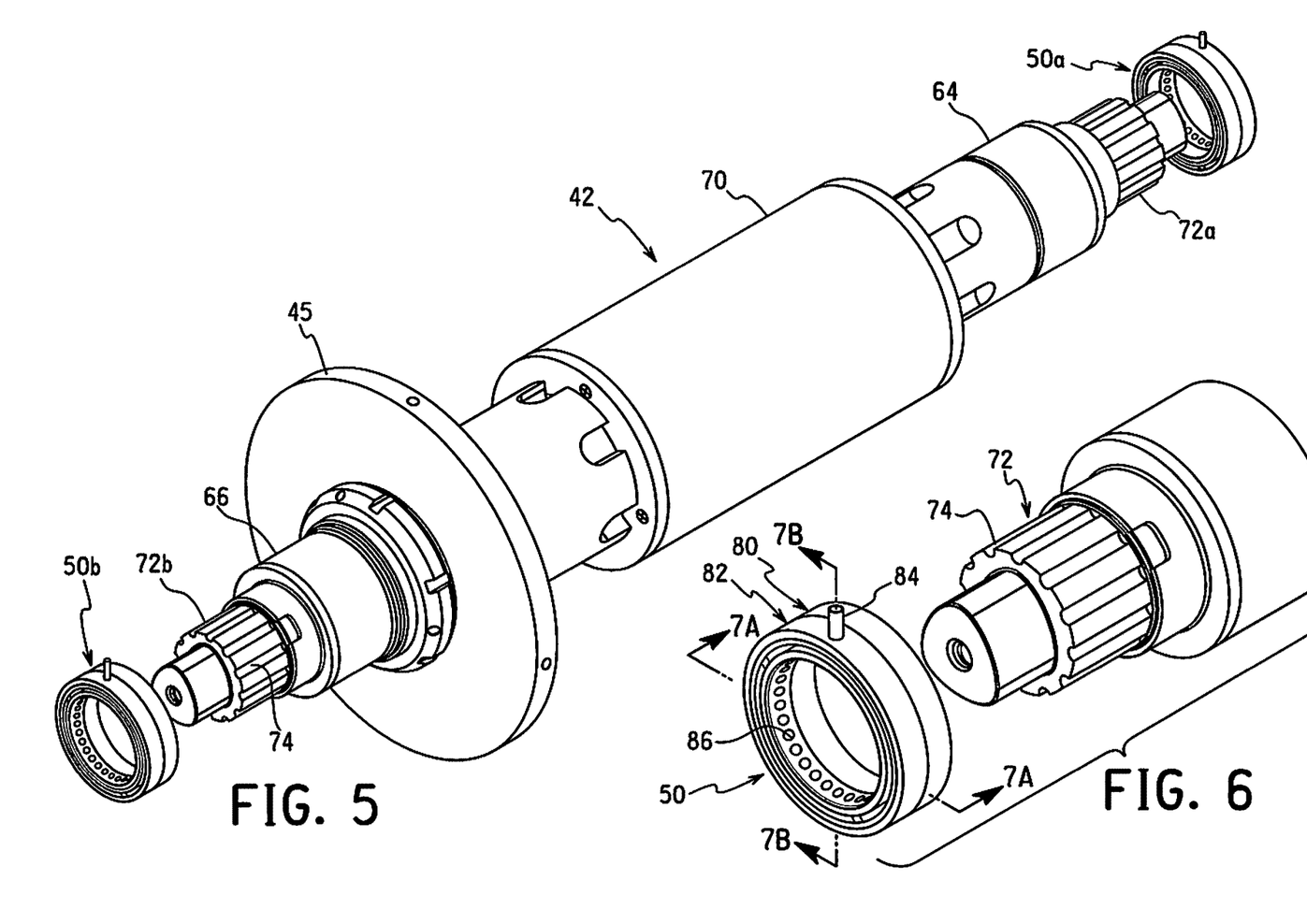
FIG. 5 is a perspective view of a shaft of the motor of the compressor illustrated in FIGS. 1-4 with the magnetic bearing backup system in accordance with an embodiment of the present invention.
FIG. 6 is an enlarged partial perspective view of the magnetic bearing backup system and part of the shaft illustrated in FIG. 5.

The shaft 42 includes a first radial magnetic bearing portion 64, a second radial magnetic bearing portion 66, an axial magnetic bearing support portion (not shown), and an enlarged portion 70. In addition, backup bearing portions 72a and 72b are disposed at opposite ends of the shaft 42. The magnetic bearing backup systems 50a and 50b are disposed to respectively surround the backup bearing portions 72a and 72b of the shaft 42, and radially support the shaft 42 in a case such as power failure or system failure, as explained in more detail below.

The first radial magnetic bearing portion 64 is magnetically radially supported by the first radial magnetic bearing 44 in a conventional manner. The axial magnetic bearing support portion has the thrust disk 45 fixedly mounted thereon in a conventional manner. The thrust disk 45 is axially magnetically supported by the axial magnetic bearing 48 in a conventional manner. The second radial magnetic bearing portion 66 is magnetically radially supported by the second radial magnetic bearing 46 in a conventional manner.

The backup bearing portions 72a and 72b have smaller diameters than the first radial magnetic bearing portion 64 and the second radial magnetic bearing portion 66. Also, a gap N between the magnetic bearing backup systems 50a, 50b and the backup bearing portions 72a, 72b is smaller than a gap M between the radial magnetic bearings 44, 46 and the radial magnetic bearing portions 64, 66 as shown in FIG. 4. Due to this configuration, the magnetic bearing backup systems 50a and 50b are disposed radially inwardly relative to the first radial magnetic bearing 44 and the second radial magnetic bearing 46. Accordingly, in a case such as power failure or system failure, the parts of the radial magnetic bearings 44 and 46 will not contact the magnetic bearing portions 64 and 66. A plurality of grooves 74 are formed on the outer circumferential surface of the backup bearing portions 72a and 72b. The grooves 74 are substantially equally spaced from each other along the outer circumferential direction of the shaft 42. The grooves 74 guide a flow of the refrigerant gas that is created by rotation of the shaft 42, as explained in more detail below.

Referring to FIGS. 6-9, the magnetic bearing backup system 50 will now be explained in more detail. The magnetic bearing backup system 50 includes a dynamic gas bearing 80 and a hydrostatic gas bearing 82 that are aligned with each other in the axial direction of the shaft 42. In the illustrated embodiment, the dynamic gas bearing 80 is disposed inwardly in the axial direction of the shaft 42, and the hydrostatic gas bearing 82 is disposed outwardly in the axial direction of the shaft 42. However, the positions of the dynamic gas bearing 80 and the hydrostatic gas bearing 82 are interchangeable. In the illustrated embodiment, the magnetic bearing backup system 50 includes one dynamic gas bearing and one hydrostatic gas bearing. However, the magnetic bearing backup system 50 may include two or more dynamic gas bearings and two or more hydrostatic gas bearings. Alternatively, the magnetic bearing backup system 50 may include only one gas bearing selected from a dynamic gas bearing and a hydrostatic gas bearing.

Figure 7A:
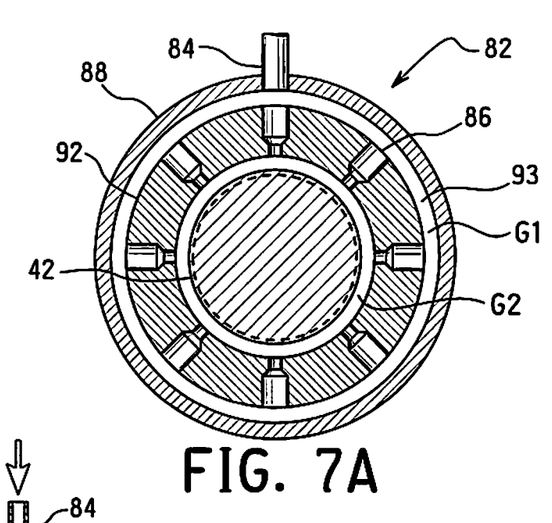
FIG. 7A is a cross-sectional view of a hydrostatic gas bearing of the magnetic bearing backup system illustrated in FIGS. 5 and 6 as viewed along section line 7A-7A of FIG. 6.
Figure 7B:
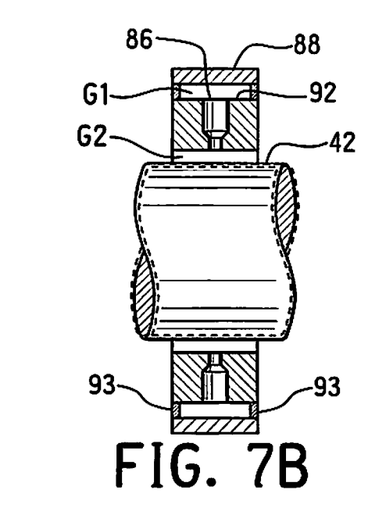
FIG. 7B is a cross-sectional view of a hydrostatic gas bearing of the magnetic bearing backup system illustrated in FIGS. 5 and 6 as viewed along section line 7B-7B of FIG. 6.
Figure 8:
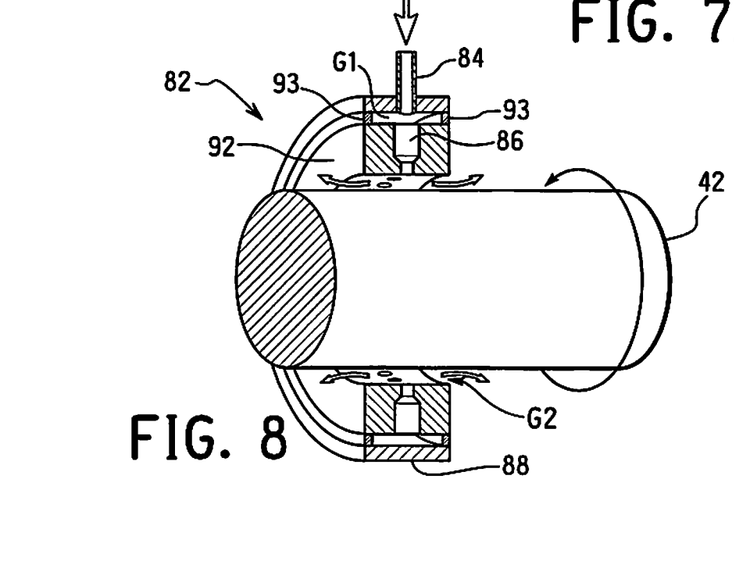
FIG. 8 is a perspective view of the hydrostatic gas bearing of the magnetic bearing backup system illustrated in FIGS. 5-7, with portions broken away and shown in cross-section for the purpose of illustration.

As shown in FIGS. 7A, 7B, and 8, the hydrostatic gas bearing 82 has a bearing stator 92 that surrounds the shaft 42, and a bearing casing 88 that covers the bearing stator 92. The bearing casing 88 is fixed to the bearing stator 92 with annular rings 93. A gap G1 between the bearing casing 88 and the bearing stator 92 is fluidly sealed with the annular rings 93. The hydrostatic gas bearing 82 also has an inlet conduit 84 and a plurality of orifices 86. The plurality of orifices 86 are through-holes formed in the bearing stator 92 radially extending from the inner circumferential surface of the bearing stator 92 to the outer circumferential surface of the bearing stator 92. In the illustrated embodiment, the orifices 86 are circumferentially equally spaced from each other. The inlet conduit 84 is disposed in the bearing casing 88 and fluidly coupled to a refrigerant supply line SL shown in FIGS. 1, 2 and 4. The inlet conduit 84 opens to the gap G1 between the bearing casing 88 and the bearing stator 92. The inlet conduit 84 is connected with the orifices 86 through the gap G1.

In the case of power or control system failure, refrigerant gas is supplied from an area between the compressor 22 or 22' and the condenser 24 in the chiller system 10 or 10' to the inlet conduit 84 through the refrigerant supply line SL, as explained in more detail below. The refrigerant gas supplied from the inlet conduit 84 is introduced to the gap G1 between the bearing casing 88 and the bearing stator 92, and then flows to the orifices 86 through the gap G1. The refrigerant gas flowing into the orifices 86 reaches a gap G2 between the bearing stator 92 and the shaft 42, and then creates a flow of the refrigerant gas as shown in FIG. 8. It should be noted that FIG. 8 is a simplified view, and thus, does not illustrate the portions of the shaft 42. In this manner, the shaft 42 is radially supported by the flow of the refrigerant gas created in the gap G2 between the bearing stator 92 and the shaft 42.

Figure 9:
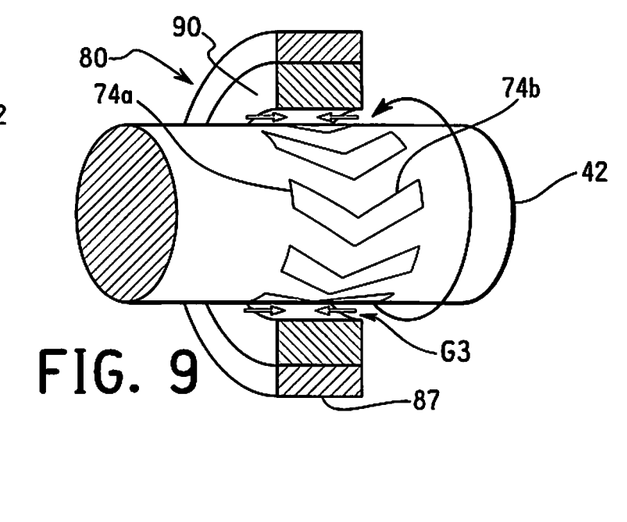
FIG. 9 is a perspective view of the dynamic gas bearing of the magnetic bearing backup system illustrated in FIGS. 5 and 6, with portions broken away and shown in cross-section for the purpose of illustration.

As shown in FIG. 9, the dynamic gas bearing 80 has a bearing stator 90 that surrounds the shaft 42, and a bearing casing 87 that covers the bearing stator 90. It should be noted that FIG. 9 is a simplified view, and thus, does not illustrate the portions of the shaft 42. As mentioned above, the shaft 42 has the grooves 74 formed on the outer circumferential surface of the shaft 42. The grooves 74 may have axial lengths extending along the entire backup bearing portions 72a and 72b as illustrated in FIGS. 5 and 6. In addition, the grooves 74 may be identical and arranged parallel to each other as illustrated in FIGS. 5 and 6. Alternatively, the grooves 74 may have axial lengths substantially corresponding to the width of the dynamic gas bearing 80. In addition, each groove 74 may have a first groove portion 74a arranged in a first direction and a second groove portion 74b arranged in a second direction intersecting the first direction as illustrated in FIG. 9. In any case, the dynamic gas bearing 80 is arranged in a position to surround the grooves 74 of the shaft 42. As the shaft 42 rotates in a rotation direction during operation of the centrifugal compressor 22 or 22', a flow of the refrigerant gas is created in a gap G3 between the bearing stator 90 and the shaft 42 by the grooves 74. In the illustrated embodiment, the flow of the refrigerant is guided by the grooves 74 as shown in FIG. 9. In this manner, the shaft 42 is radially supported by the flow of the refrigerant gas created in the gap G3 between the bearing stator 90 and the shaft 42.

The gas bearing configurations of the illustrated embodiment are merely examples. However, it will be apparent to those skilled in the art from this disclosure that various changes and modifications can be made in the dynamic gas bearing 80 and the hydrostatic gas bearing 82 used for the magnetic bearing backup system 50. For example, the precise number, location and/or structure of the orifices 86 and the inlet conduit 84 in the hydrostatic gas bearing 82 can be changed. Also, the exact groove configuration may be calculated based on refrigerant flow simulation and/or the characteristics of the grooves 74 of the shaft 42 to make the dynamic gas bearing 80 more efficient.

In a normal operation, the magnetic bearing assembly 40 magnetically supports the shaft 42. However, when the magnetic bearing assembly 40 stops operating in the case of power or control system failure, the magnetic bearing backup system 50 supports the shaft 42 as a backup of the magnetic bearing assembly 40. As discussed above, the chiller systems 10 and 10' has the expansion valve 29. The expansion valve 29 is disposed in the refrigerant supply line SL which connects an area between the compressor 22 or 22' and the condenser 24 to supply refrigerant gas from the area between the compressor 22 or 22' and the condenser 24 to the magnetic bearing backup system 50 in the case of power or control system failure. The expansion valve 29 is a solenoid valve or a motor-operated valve which is closed by power supplied thereto in a normal state, and the expansion valve 29 shares a power supply with the magnetic bearing assembly 40. Thus, when the power supply system shuts down, the magnetic bearing assembly 40 stops operating, and the expansion valve 29 is opened at the same time. This allows the refrigerant gas to flow into the magnetic bearing backup system 50 from the area between the compressor 22 or 22' and the condenser 24 through the expansion valve 29.

In a case where the pressure difference between the suction side and the discharge side of the compressor 20 or 22' is large, the pressure of the refrigerant gas introduced into the hydrostatic gas bearing 82 through the inlet conduit 84 is high, and thus a flow of the refrigerant gas is created in the gap G2 between the bearing stator 92 of the hydrostatic gas bearing 82 and the shaft 42 as shown in FIG. 8. As a result, the hydrostatic gas bearing 82 can support the shaft 42 by the flow of the refrigerant gas created in the gap G2. Also, in a case where the rotation speed of the shaft 42 is high, the grooves 74 of the shaft 42 creates a flow of the refrigerant gas in the gap G3 between the bearing stator 90 of the dynamic gas bearing 80 and the shaft 42 as shown in FIG. 9. As a result, the dynamic gas bearing 80 can support the shaft 42 by the flow of the refrigerant gas created in the gap G3. In this manner, the refrigerant gas flowing into the magnetic bearing backup system 50 can be used as a lubricant in accordance with the present invention.

In the illustrated embodiment, the refrigerant gas introduced from the area between the compressor 22 or 22' and the condenser 24 is returned to the area between the compressor 22 or 22' and the evaporator 28 in the chiller systems 10 and 10' as shown in FIGS. 1 and 2. However, the configurations of the illustrated embodiment are merely examples. It will be apparent to those skilled in the art from this disclosure that various changes and modifications can be made in this configuration. For example, the refrigerant gas introduced from the area between the compressor 22 or 22' and the condenser 24 may be returned to any area between the compressor 22 or 22' and the expansion valve or orifice 27.

Figure 10:
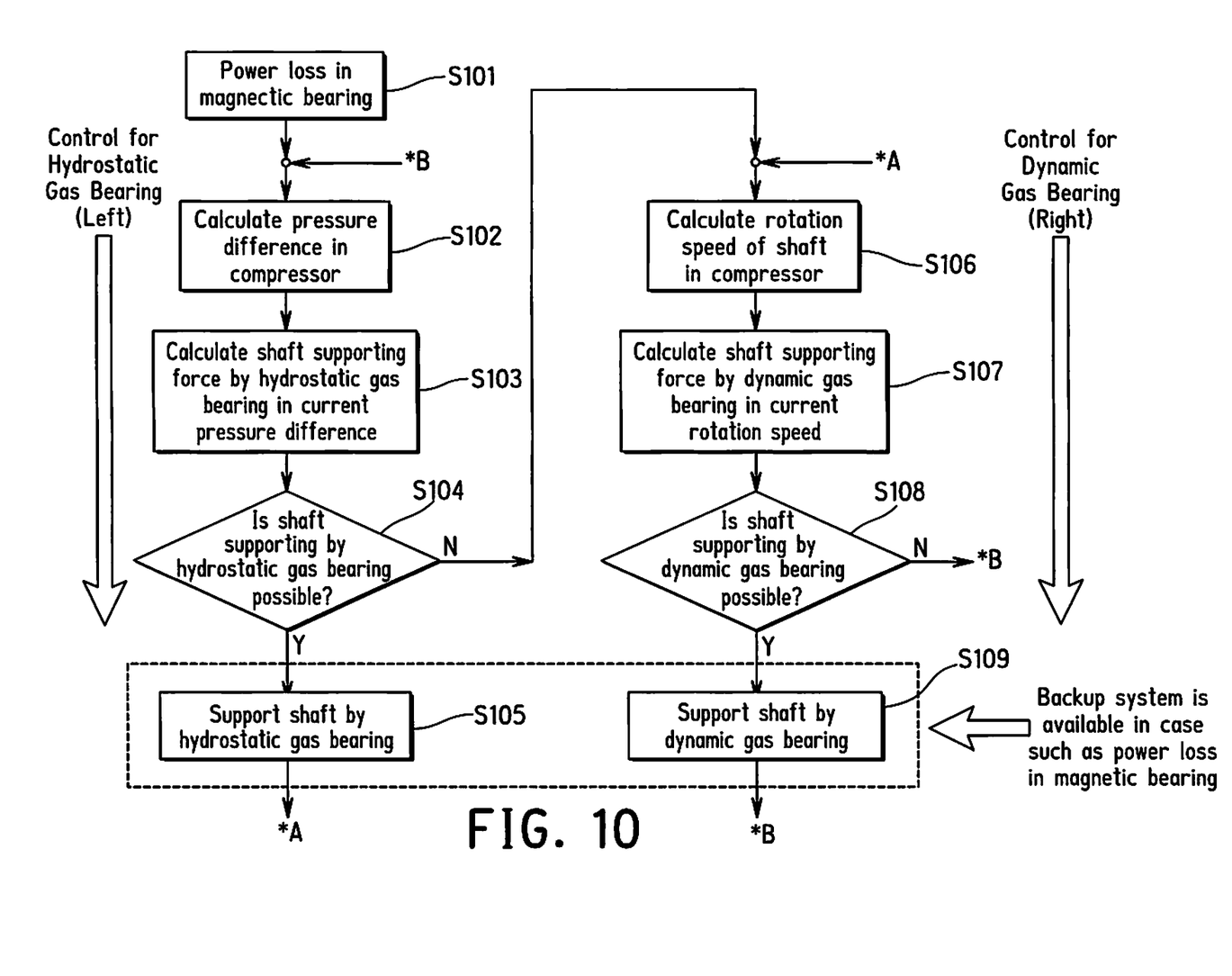
FIG. 10 is a flow chart illustrating a method of controlling the magnetic bearing backup system.

Referring to FIG. 10, a process of controlling the magnetic bearing backup system 50 will now be explained in more detail. When a power loss occurs in the magnetic bearing assembly 40 (step S101), the chiller controller 20 calculates the pressure difference between the suction side and the discharge side of the compressor 20 or 22' in step S102. The chiller controller 20 then calculates the shaft supporting force by the hydrostatic gas bearing 82 in the current pressure difference between the suction side and the discharge side of the compressor 20 or 22' in step S103. Next, it is determined whether or not the hydrostatic gas bearing 82 can support the shaft 42 depending on the shaft supporting force of the hydrostatic gas bearing 82 (step S104). In a case where the shaft supporting force is sufficient (Yes in step S104), the shaft 42 is supported by the hydrostatic gas bearing 82 using the flow of the refrigerant gas supplied thereto (step S105). In a case where the shaft supporting force is not sufficient (No in step S104), the process will proceed to step S106.

In step S106, the chiller controller 20 calculates the rotation speed of the shaft 42 of the compressor 20 or 22'. The chiller controller 20 then calculates the shaft supporting force by the dynamic gas bearing 80 in the current rotation speed of the shaft 42 of the compressor 20 or 22' in step S107. Next, it is determined whether or not the dynamic gas bearing 80 can support the shaft 42 depending on the shaft supporting force of the dynamic gas bearing 80 (step S108). In a case where the shaft supporting force is sufficient (Yes in step S108), the shaft 42 is supported by the dynamic gas bearing 80 using the flow of the refrigerant gas created by the grooves 74 (step S109). In a case where the shaft supporting force is not sufficient (No in step S108), the process will return to step S102. See *B in FIG. 10.

When the shaft 42 is supported by the hydrostatic gas bearing 82 using the flow of the refrigerant gas supplied thereto in step S105, the process may also proceed to step S106. See *A in FIG. 10. In this case, if the shaft 42 is also supported by the dynamic gas bearing 80 using the flow of the refrigerant gas created by the grooves 74 in step S109, the shaft 42 is supported by both of the hydrostatic gas bearing 82 and the dynamic gas bearing 80.

As shown in FIG. 10, in the process in accordance with the present invention, it is determined whether or not the hydrostatic gas bearing 82 can support the shaft 42 based on the pressure difference between the suction side and the discharge side of the compressor 20 or 22, and it is determined whether or not the dynamic gas bearing 80 can support the shaft 42 based on the rotation speed of the shaft 42 of the compressor 20 or 22'. The status of steps S105 and S109 is achieved/performed automatically without using the chiller controller 20, and the chiller controller 20 is used for monitoring the hydrostatic gas bearing 82 and the dynamic gas bearing 80. The process can be repeated depending on the operation status of the compressor 20 or 22'.

In the magnetic bearing backup system 50 in accordance with the present invention, the dynamic gas bearing 80 and the hydrostatic gas bearing 82 support the shaft 42 as a backup of the magnetic bearing assembly 40 in the case of power or control system failure as discussed above. In summary, in a case where the rotation speed of the shaft 42 is high and the pressure difference in the compressor 20 or 22' is large, both of the dynamic gas bearing 80 and the hydrostatic gas bearing 82 support the shaft 42. In a case where the rotation speed of the shaft 42 is high and the pressure difference in the compressor 20 or 22' is small, mainly the dynamic gas bearing 80 supports the shaft 42. In a case where the rotation speed of the shaft 42 is low and the pressure difference in the compressor 20 or 22' is large, mainly the hydrostatic gas bearing 82 supports the shaft 42. See Table 1 below. Incidentally, the case of power or control system failure includes any event that causes the shaft 42 not to be supported by the magnetic bearing assembly 40.

TABLE 1

| Compressor status | | Bearing that supports shaft in case |
|---|---|---|
| Rotation speed | Pressure difference | of power or control system failure |
| High | Large | Both dynamic gas bearing and hydrostatic gas bearing |
| High | Small | Mainly dynamic gas bearing |
| Low | Large | Mainly hydrostatic gas bearing |

Referring to FIGS. 1 and 2, the chiller controller 20 may include numerous control sections programmed to control the conventional parts in a conventional manner. For example, a conventional magnetic bearing control section, a conventional compressor variable frequency drive, a conventional compressor motor control section, a conventional inlet guide vane control section, and a conventional expansion valve control section. These sections can be separate or combined sections.

In the illustrated embodiment, the control sections are sections of the chiller controller 20 programmed to execute the control of the parts described herein. However, it will be apparent to those skilled in the art from this disclosure that the precise number, location and/or structure of the control sections, portions and/or chiller controller 20 can be changed without departing from the present invention so long as the one or more controllers are programmed to execute control of the parts of the chiller system 10 or 10' as explained herein.

The chiller controller 20 is conventional, and thus, includes at least one microprocessor or CPU, an Input/output (I/O) interface, Random Access Memory (RAM), Read Only Memory (ROM), a storage device (either temporary or permanent) forming a computer readable medium programmed to execute one or more control programs to control the chiller system 10 or 10'. The chiller controller 20 may optionally include an input interface such as a keypad to receive inputs from a user and a display device used to display various parameters to a user. The parts and programming are conventional, and thus, will not be discussed in detail herein, except as needed to understand the embodiment(s).

In terms of global environment protection, use of new low GWP (Global Warming Potential) refrigerants such like R1233zd, R1234ze are considered for chiller systems. The global warming potential (GWP) of low global warming potential refrigerants is approximately 300 or less. One example of the low global warming potential refrigerant is low pressure refrigerant in which the evaporation pressure is equal to or less than the atmospheric pressure. For example, low pressure refrigerant R1233zd is a candidate for centrifugal chiller applications because it is non-flammable, non-toxic, low cost, and has a high COP compared to other candidates such like R1234ze, which are current major refrigerant R134a alternatives. In the illustrated embodiment, the cooling medium is refrigerant used in the chiller system 10 or 10'. Preferably the refrigerant is at least one of a low pressure refrigerant (LPR) and a low global warming potential (GWP) refrigerant. More specifically, the low pressure refrigerant (LPR) may be R1233zd and/or the low global warming potential (GWP) refrigerant may be R1234ze or R1234yf. The refrigerant may be a mixed refrigerant which includes at least one of the above-mentioned low global warming potential (GWP) refrigerants. However, the magnetic bearing backup system in accordance with the present invention can apply to a chiller system which uses any of the above-mentioned refrigerants.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A centrifugal compressor used to compress refrigerant and adapted to be used in a chiller system including an evaporator, a condenser, and an expansion mechanism, the centrifugal compressor comprising:
    a casing having an inlet portion and an outlet portion;
        an impeller attached to a shaft rotatable about a rotation axis;
    a motor configured and arranged to rotate the shaft in order to rotate the impeller;
    a diffuser disposed in the outlet portion downstream of the impeller;
    a magnetic bearing rotatably supporting the shaft, the magnetic bearing being arranged on a magnetic bearing portion of the shaft; and
    a magnetic bearing backup system configured and arranged to support the shaft when the magnetic bearing stops operating, the magnetic bearing backup system including
        at least one dynamic gas bearing and at least one hydrostatic gas bearing arranged on a backup bearing portion of the shaft so as to be adjacent to each other in an axial direction of the shaft, and
        a refrigerant supply line arranged to supply a refrigerant gas to a first gap between the at least one hydrostatic gas bearing and the backup bearing portion,
        the first gap being smaller than a second gap between the magnetic bearing portion and the magnetic bearing,
        the at least one dynamic gas bearing and the at least one hydrostatic gas bearing being disposed radially inwardly relative to the magnetic bearing.

2. The centrifugal compressor according to claim 1, wherein
    the at least one dynamic gas bearing and the at least one hydrostatic gas bearing are disposed adjacent to both ends of the shaft of the compressor in an axial direction, respectively.

3. The centrifugal compressor according to claim 1, wherein
    the at least one dynamic gas bearing has a bearing stator that surrounds the shaft, and
    the shaft is provided with grooves that are formed on an outer circumferential surface of the shaft.

4. The centrifugal compressor according to claim 3, wherein
    the at least one dynamic gas bearing supports the shaft by a flow of the refrigerant gas that is created by rotation of the shaft of the compressor, and
    the flow of the refrigerant gas is guided by the grooves of the shaft.

5. The centrifugal compressor according to claim 3, wherein
    the grooves of the shaft are substantially equally spaced from each other along an outer circumferential direction of the shaft.

6. The centrifugal compressor according to claim 1, wherein
    the at least one hydrostatic gas bearing has
        an inlet conduit connected to the refrigerant supply line to receive the refrigerant gas, and a bearing stator that surrounds the shaft, the bearing stator being provided with orifices to supply the refrigerant gas between the bearing stator and the shaft through the orifices, the inlet conduit being connected with the orifices of the bearing stator to introduce the refrigerant gas.

7. The centrifugal compressor according to claim 6, wherein the refrigerant supply line is arranged to introduce the refrigerant gas to the inlet conduit from an area between the compressor and the condenser in the chiller system.

8. The centrifugal compressor according to claim 7, wherein the expansion mechanism in the chiller system includes at least one of a solenoid valve and a motor-operated valve, the expansion mechanism being powered by a power source shared with the magnetic bearing, and when a power supply from the power source stops, the expansion mechanism is opened and the refrigerant gas is allowed to flow therethrough toward the at least one hydrostatic gas bearing such that the at least one hydrostatic gas bearing keeps supporting the shaft by the refrigerant gas even after the magnetic bearing stops.

9. The centrifugal compressor according to claim 1, wherein both of the at least one dynamic gas bearing and the at least one hydrostatic gas bearing support the shaft in a case where a rotation speed of the shaft is high and a pressure difference between a suction side and a discharge side of the compressor is large.

10. The centrifugal compressor according to claim 1, wherein mainly the at least one dynamic gas bearing supports the shaft in a case where a rotation speed of the shaft is high and a pressure difference between a suction side and a discharge side of the compressor is small.

11. The centrifugal compressor according to claim 1, wherein mainly the at least one hydrostatic gas bearing supports the shaft in a case where a rotation speed of the shaft is low and a pressure difference between a suction side and a discharge side of the compressor is large.

12. The centrifugal compressor according to claim 1, wherein the refrigerant is a low global warming potential (GWP) refrigerant.

13. A magnetic bearing backup system for a centrifugal compressor used to compress refrigerant and adapted to be used in a chiller system, the magnetic bearing backup system comprising:

at least one dynamic gas bearing and at least one hydrostatic gas bearing configured and arranged to support the shaft when a magnetic bearing of the centrifugal compressor stops operating, the at least one dynamic gas bearing and the at least one hydrostatic gas bearing being arranged on a backup bearing portion of a shaft of the centrifugal compressor so as to be adjacent to each other in an axial direction of the shaft; and a refrigerant supply line arranged to supply a refrigerant gas to a first gap between the at least one hydrostatic gas bearing and the backup bearing portion, the first gap being smaller than a second gap between a magnetic bearing portion of the shaft and the magnetic bearing, and the at least one dynamic gas bearing and the at least one hydrostatic gas bearing being disposed radially inwardly relative to the magnetic bearing.

14. The magnetic bearing backup system according to claim 13, wherein the at least one dynamic gas bearing and the at least one hydrostatic gas bearing support the shaft by using the refrigerant gas as a lubricant.

15. The magnetic bearing backup system according to claim 13, wherein the at least one dynamic gas bearing has a bearing stator to surround the shaft, and a flow of the refrigerant gas is created between the bearing stator and the shaft having grooves formed on an outer circumferential surface of the shaft.

16. The magnetic bearing backup system according to claim 13, wherein the at least one hydrostatic gas bearing has
an inlet conduit connected to the refrigerant supply line to receive the refrigerant gas, and
a bearing stator that surrounds the shaft, the bearing stator being provided with orifices to supply the refrigerant gas between the bearing stator and the shaft through the orifices,
the inlet conduit being connected with the orifices of the bearing stator to introduce the refrigerant gas.

17. The magnetic bearing backup system according to claim 13, wherein the refrigerant is a low global warming potential (GWP) refrigerant.

18. The magnetic bearing backup system according to claim 13, wherein an outer diameter of the backup bearing portion is smaller than an outer diameter of the magnetic bearing portion.

19. The centrifugal compressor according to claim 1, wherein an outer diameter of the backup bearing portion is smaller than an outer diameter of the magnetic bearing portion.

* * * * *